July 28, 1959 W. D. McCOURTY 2,896,700
FUEL SUPPLY SYSTEMS FOR GAS TURBINE ENGINES
Filed Jan. 18, 1956 2 Sheets-Sheet 1

INVENTOR
WILLIAM DONALD McCOURTY
ATTORNEYS

United States Patent Office 2,896,700
Patented July 28, 1959

2,896,700

FUEL SUPPLY SYSTEMS FOR GAS TURBINE ENGINES

William Donald McCourty, Wolverhampton, England, assignor to H. M. Hobson Limited, London, England, a British company Application January 18, 1956, Serial No. 560,038

Claims priority, application Great Britain January 24, 1955

3 Claims. (Cl. 158—36.4)

There is disclosed in United States Patent No. 2,761,495, issued September 4, 1956, assigned to the owner of the present application a fuel supply apparatus, herein referred to as a fuel supply apparatus as specified, for controlling the speed of a gas turbine engine during acceleration thereof to a controlled speed, comprising an engine driven fuel pump, a fuel supply conduit between the pump and the engine having therein two flow control orifices in series, an over-fuelling control valve controlling one of said orifices which is effective to prevent excessive over-fuelling during an initial critical range of engine speed but normally permits of substantial over-fuelling when the upper limit of said speed range has been exceeded and during acceleration of the engine to a higher speed, a speed governor comprising a speed-responsive element and an acceleration-responsive element, a metering valve controlling the other orifice, and a servo valve responsive to both elements of the governor for actuating the metering valve, when a given speed has been attained, to regulate the amount of fuel supplied to the engine during subsequent acceleration thereof to the controlled speed so that the controlled speed is approached with a diminishing rate of acceleration and is finally reached as the acceleration is reduced to zero, thereby eliminating overshoot and to maintain the engine speed at the controlled value when attained.

The present invention provides a fuel supply apparatus as above specified, in which the servo valve is subjected at one side to a force exerted by the governor, tending to open it, and at the other side to a force, tending to close it, exerted by a device responsive to air intake temperature and increasing with air intake temperature, means being provided for adjusting the datum of the temperature responsive device.

Two alternative embodiments of the invention will now be described in detail, by way of example, with reference to the accompanying drawing in which.

Figure 1:
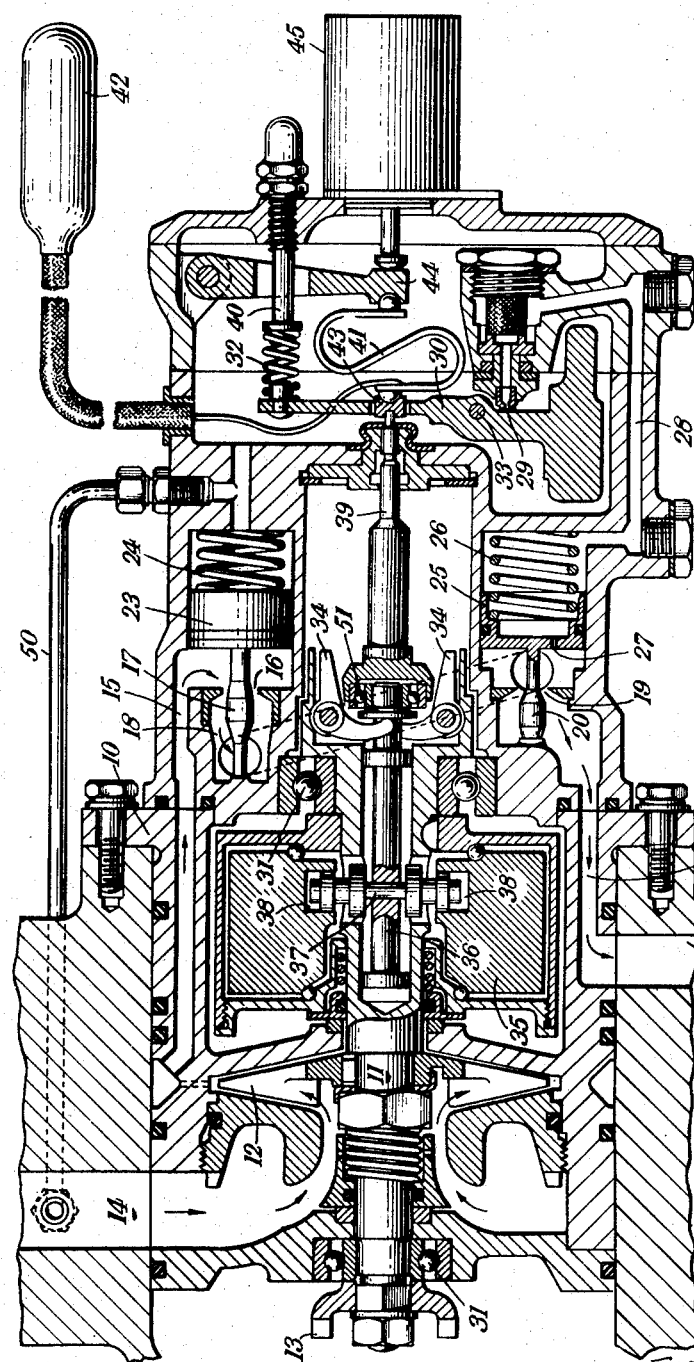
Fig. 1 is a diagrammatic longitudinal section through the first embodiment.

The apparatus shown in Fig. 1 comprises a casing 10, in which is journalled, in bearings 31, a shaft 11 carrying the impeller 12 of a centrifugal pump. The shaft carries dogs 13 by which it may be driven from a gas turbine engine. Fuel entering the casing through an inlet 14 is fed by the pump along a passage 15, through an orifice 16 controlled by an over-fuelling valve 17, along a passage 18, through an orifice 19 controlled by a metering valve 20, and along a passage 21 to an outlet 22, whence it is delivered to the engine.

As explained in said United States Patent No. 2,761,495, during the initial acceleration to a controlled speed of the gas turbine engine, the flow of fuel to the engine is controlled by the over-fuelling valve 17. This is attached to a piston 23, loaded by a spring 24 and subject to the pump delivery pressure. As the speed of the engine increases, the piston 23 moves to the right to cause the over-fuelling valve 17 to reduce the effective area of the orifice 16. The profile of the valve 17 is such that, as it moves to the right in response to increase in the pump delivery pressure, it severely restricts the flow of fuel through the orifice 16 during an initial critical range of speed but it thereafter permits of considerably increased flow of fuel through the orifice 16.

The metering valve is attached to a servo piston 25, subject to the pump delivery pressure less the pressure drop across the over-fuelling valve 17 and loaded by a spring 26. The servo piston 25 is formed with an orifice 27, through which fuel may flow via a passage 28 to an orifice 29 which is initially closed by a servo valve, constituted by a lever 30, pivoted on a pin 33 and urged by a spring 32 in the direction to close the orfice 28.

Within the casing is a speed governor, comprising a speed responsive element, constituted by bob weights 34, and an acceleration responsive element, constituted by a fly weight 35 coupled to a rod 36 by a pin 37 engaging inclined slots 38 in the flywheel. The rod 36 bears against a rod 39 through the agency of a bearing 51 and, as fully explained in said United States Patent No. 2,761,495, the two elements of the governor jointly exert through the rod 39 a force on the lever 30 tending to move it to open the orifice 29. When the servo valve 30 opens, fuel may flow from the right hand side of the servo piston to the suction side of the pump 12 through a pipe 50, so permitting the servo piston to move to actuate the metering valve 20.

Figure 3:
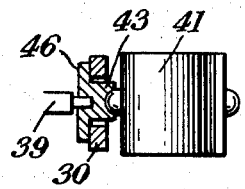
Fig. 3 is a detail view.

The speed governor thus seeks to open the servo valve 30, while the spring 32, which is provided with an adjustable abutment 40, seeks to close it. Also tending to close the valve 30 is a Bourdon tube 41 connected to a temperature sensitive element 42 exposed to air intake temperature. The Bourdon tube 41 abuts at one end against a thrust pad 43 and at the other end against a pivoted lever 44, the position of which is adjustable, to vary the datum of the system, by an electric motor 45. The push rod 39 abuts against the other side of the thrust pad 43, which is supported on the valve lever 30 by knife edges 46 (Fig. 3), the axes of which are parallel to the pivotal axis of the valve lever.

The purpose of the addition of the Bourdon tube 41 between the external speed adjusting agency and the valve lever 30 is to control engine speed with intake temperature at the maximum nominal speed setting, in such a way that the engine speed increases with increase in intake temperature. The requirement is that $N/\sqrt{\theta}$ is a constant where N is the engine speed in r.p.m. and $\theta = T/288$, T being the intake temperature in centigrade° absolute and 288 being the sea level temperature of the International Standard Atmosphere. When the Bourdon tube 41 operates, in response to an increase in air intake temperature, to increase the flow of fuel to the engine, there is a momentary increase in the fuel/air ratio. This, however, is of no consequence because, as the result of the reduced air density, the mass airflow through the compressor is reduced and there is a consequent increase in speed of the compressor. The governor senses this increase in speed and effects a corresponding reduction in the fuel supply to the engine almost simultaneously with the momentary increase in fuel/air ratio.

In the device as shown the function $N/\sqrt{\theta}$=constant is accurately maintained at the maximum nominal speed setting only, and as speed is reduced, using the external datum adjustment 45, the temperature correction gives a speed in excess of that required by the $N/\sqrt{\theta}$ function. This will not matter at speeds below the nominal maximum, as the resultant engine temperatures (i.e. combustion, turbine and jet pipe) will already be below the allowable maxima in spite of the fact that the engine would be over-speeding with temperature.

Figure 4:
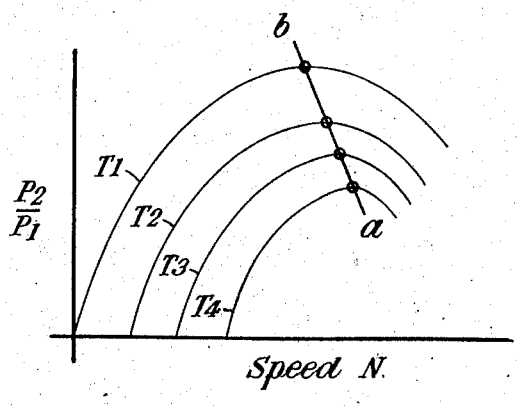
Figs. 4 and 5 are graphs.
Figure 5:
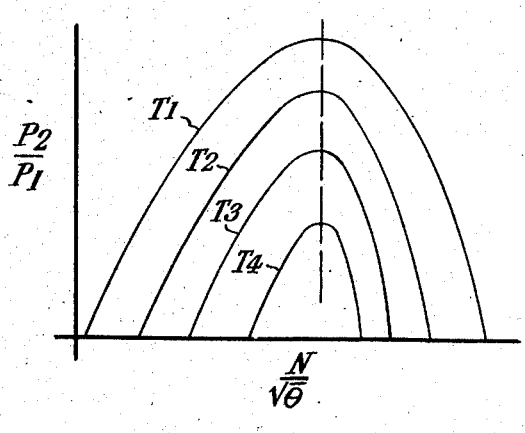

The purpose of the aforesaid variation of engine speed to compensate for changes in air intake temperature will be appreciated from Figs. 4 and 5. In Fig. 4 the compressor pressure ratio $P_2/P_1$ is plotted against engine speed for various air intake temperatures $T_1$—$T_4$. As will be seen, the maximum value of the ratio $P_2/P_1$ occurs at different values of N as the air intake temperature varies, the maximum values following the line $ab$. To ensure that $P_2/P_1$ will be a maximum at different air intake temperatures it is necessary for the engine speed N to be so varied with temperature changes that the line $ab$ is followed. The relationship between N and air intake temperature is such that the line $ab$ will be followed provided that the ratio $N/\sqrt{\theta}$ is maintained constant as indicated above, and the Bourdon tube 41 serves to maintain this relationship. In Fig. 5, the ratio $P_2/P_1$ is plotted against $N/\sqrt{\theta}$ for various air intake temperatures and will be seen that the maximum values of $P_2/P_1$ occur at the same value of $N/\sqrt{\theta}$ for all air intake temperatures.

Figure 2:
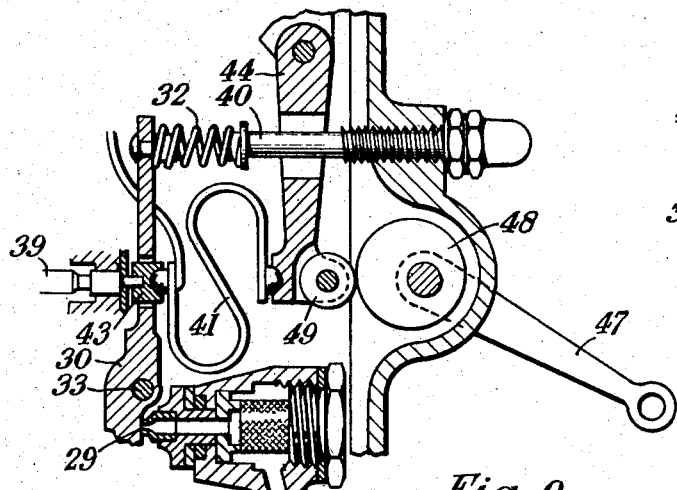
Fig. 2 is a sectional view showing a modified external speed adjusting agency.

The embodiment of Fig. 2 differs from that of Fig. 1, in that the external speed adjusting agency is a lever 47, carrying a cam 48 coacting with a roller 49 on the lever 44.

What I claim as my invention and desire to secure by Letters Patent is:

1. Fuel supply apparatus for controlling the speed of a gas turbine engine during acceleration thereof to a controlled speed, comprising an engine driven fuel pump, a fuel supply conduit between the pump and the engine having therein two flow control orifices in series, an overfuelling control valve controlling one of said orifices, said over-fuelling control valve being effective to prevent excessive over-fuelling during an initial critical range of engine speed, a speed governor comprising a speed-responsive element and an acceleration-responsive element, a metering valve controlling the other of said orifices, an initially closed servo valve, means operated by both elements of said governor for exerting on said servo valve a force tending to open it in response to increase in engine speed, means responsive to opening of the servo valve for actuating the metering valve to regulate the amount of fuel supplied to the engine during subsequent acceleration thereof to the controlled speed and to maintain the engine speed at the controlled value when attained, a device responsive to air intake temperature arranged to exert on the servo valve a force tending to close it and increasing with air intake temperature, and means for adjusting the datum of said temperature responsive device.

2. A fuel supply apparatus according to claim 1, wherein the servo valve is constituted by a pivoted lever and comprising a thrust pad subject at one side to the force exerted by the temperature responsive device, knife edges supporting said thrust pad on said pivoted lever and a push rod for applying to the other side of said thrust pad the force exerted by the governor.

3. A fuel supply apparatus according to claim 1, wherein said governor, temperature responsive device, servo valve and metering valve cooperate to maintain, when said datum adjusting means is set for maximum speed of said engine, and engine speed defined by the formula $N/\sqrt{\theta}$=constant, wherein N is the engine speed in revolutions per minute and $\theta=T/288$, T being the intake temperature in degrees absolute.

References Cited in the file of this patent
UNITED STATES PATENTS

| | | |
|---|---|---|
| 2,422,808 | Stokes | June 24, 1947 |
| 2,750,734 | Anxionnaz et al. | June 19, 1956 |
| 2,761,495 | Greenland | Sept. 4, 1956 |